United States Patent
Gandhi et al.

(10) Patent No.: US 10,929,295 B2
(45) Date of Patent: Feb. 23, 2021

(54) ACCELERATING REPLICATION OF PAGE TABLES FOR MULTI-SOCKET MACHINES

(71) Applicant: VMware, Inc., Palo Alto, CA (US)

(72) Inventors: Jayneel Gandhi, Sunnyvale, CA (US); Pratap Subrahmanyam, Saratoga, CA (US); Irina Calciu, Palo Alto, CA (US); Aasheesh Kolli, Santa Clara, CA (US)

(73) Assignee: VMware, Inc., Palo Alto, CA (US)

(*) Notice: Subject to any disclaimer, the term of this patent is extended or adjusted under 35 U.S.C. 154(b) by 19 days.

(21) Appl. No.: 16/255,432

(22) Filed: Jan. 23, 2019

(65) Prior Publication Data

US 2020/0233804 A1    Jul. 23, 2020

(51) Int. Cl.
| | | |
|---|---|---|
| G06F 12/00 | (2006.01) |
| G06F 12/0853 | (2016.01) |
| G06F 12/1045 | (2016.01) |
| G06F 12/0804 | (2016.01) |
| G06F 12/0817 | (2016.01) |
| G06F 12/1009 | (2016.01) |

(52) U.S. Cl.
CPC ...... *G06F 12/0853* (2013.01); *G06F 12/0804* (2013.01); *G06F 12/0822* (2013.01); *G06F 12/1009* (2013.01); *G06F 12/1063* (2013.01); *G06F 2212/657* (2013.01)

(58) Field of Classification Search
CPC ............. G06F 12/0853; G06F 12/0804; G06F 12/0822; G06F 12/1009; G06F 12/1063; G06F 2212/657
See application file for complete search history.

(56) References Cited

U.S. PATENT DOCUMENTS

| | | | | |
|---|---|---|---|---|
| 5,440,727 A | * | 8/1995 | Bhide | G06F 16/273 711/117 |
| 2006/0230209 A1 | * | 10/2006 | Gregg | G06F 9/546 710/263 |
| 2011/0231615 A1 | * | 9/2011 | Ober | G06F 12/0868 711/142 |
| 2012/0151116 A1 | * | 6/2012 | Tuch | G06F 12/1009 711/6 |
| 2013/0097458 A1 | * | 4/2013 | Sekino | G06F 11/1441 714/6.3 |
| 2015/0301953 A1 | * | 10/2015 | Bybell | G06F 12/1045 711/207 |
| 2018/0067849 A1 | * | 3/2018 | Kanno | G06F 12/0292 |
| 2018/0293701 A1 | * | 10/2018 | Appu | G06F 9/4881 |
| 2020/0034297 A1 | * | 1/2020 | Calciu | G06F 12/0828 |

* cited by examiner

*Primary Examiner* — Daniel D Tsui
(74) *Attorney, Agent, or Firm* — Patterson & Sheridan, LLP (57) ABSTRACT

Described herein is a method for tracking changes made by an application. Embodiments include determining, by a processor, a write-back of a cache line from a hardware unit associated with a socket of a plurality of sockets to a page table entry of a page table in a memory location associated with the processor. Embodiments include adding, by the processor, the cache line to a list of dirty cache lines. Embodiments include, for each respective cache line in the list of dirty cache lines, identifying, by the processor, a memory location associated with a respective socket of the plurality of sockets corresponding to the respective cache line and updating, by the processor, an entry of a page table replica at the memory location based on the respective cache line.

20 Claims, 5 Drawing Sheets

ACCELERATING REPLICATION OF PAGE TABLES FOR MULTI-SOCKET MACHINES

BACKGROUND

Computing is becoming more data centric, where low-latency access to a very large amount of data is critical. This trend is largely supported by an increasing role of big-data applications in our day-to-day lives. In addition, virtual machines are playing a critical role in server consolidation, security and fault tolerance as substantial computing migrates to shared resources in cloud services. This trend is evident due to increasing support for public, enterprise and private cloud services by various companies. These trends put a lot of pressure on the virtual memory system—a layer of abstraction designed for applications to manage physical memory easily.

The virtual memory system translates virtual addresses issued by the application to physical addresses for accessing the stored data. Since the software stack accesses data using virtual addresses, fast address translation is a prerequisite for efficient data-centric computation and for providing the benefits of virtualization to a wide range of applications. But unfortunately, growth in physical memory sizes is exceeding the capabilities of the virtual memory abstraction—paging. Paging has been working well for decades in the old world of scarce physical memory, but falls far short in the new world of gigabyte-to-terabyte memory sizes.

SUMMARY

An embodiment is a method for tracking change made by an application. The method includes determining, by a processor, a write-back of a cache line from a hardware unit associated with a socket of a plurality of sockets to a page table entry of a page table in a memory location associated with the processor; adding, by the processor, the cache line to a list of dirty cache lines; and for each respective cache line in the list of dirty cache lines: identifying, by the processor, a memory location associated with a respective socket of the plurality of sockets corresponding to the respective cache line; and updating, by the processor, an entry of a page table replica at the memory location based on the respective cache line.

Further embodiments include a computer readable medium containing instructions for carrying one or more aspects of the above method, and a system configured to carry out one or more aspects of the above method.

DETAILED DESCRIPTION

Embodiments described herein provide techniques for efficient replication of page tables across different sockets of a computing system. A page table generally stores mappings between virtual addresses and physical addresses, and is used to perform address translation from a virtual address space, such as used by applications and virtualized components such as virtual machines, to a physical address space, such as of the physical memory. Replication of page tables on multi-socket machines generally improves efficiency by allowing a processing unit associated with an individual socket (e.g., a CPU socket) to read from a local replica of a page table in a memory location associated with the individual socket rather than from a page table that may be stored remotely. In particular, latency in accessing local memory may be less than latency in accessing remote memory. However, replicating page tables in memory locations associated with multiple sockets presents certain challenges. For instance, all updates to one page table replica must be propagated to the other page table replicas in order to keep the system coherent. As such, embodiments of the present disclosure involve using a cache-coherent field programmable gate array (FPGA) to track all updates to the page table via a master copy of the page table stored in a memory location associated with the FPGA, and ensure that replicas of the page table in memory locations associated with other sockets are kept up to date. It should be noted that though certain aspects are described with respect to an FPGA, other hardware computing units/processors may similarly be used.

An FPGA is a chip that can be dynamically programmed to implement custom hardware functionality without requiring physical reconfiguration of the hardware. Digital computing tasks may be developed in software and compiled into a configuration file or bitstream that contains information on how the components of the FPGA should be wired together. As such, an FPGA may be programmed to perform certain operations described herein related to efficient replication of page tables in multi-socket systems.

Figure 1:
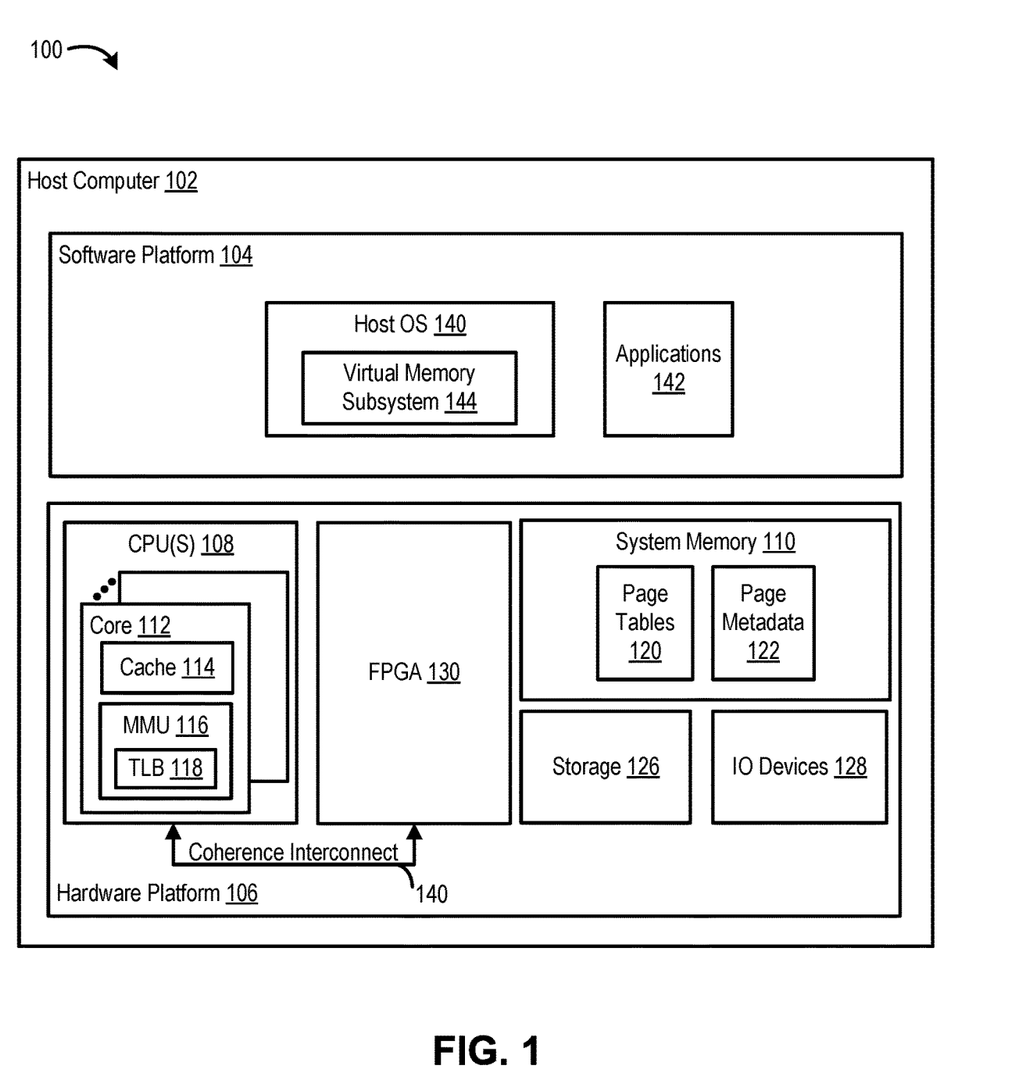
FIG. 1 depicts an example computing system with which embodiments may be implemented.

FIG. 1 is a block diagram depicting a computing system 100 according to an embodiment. Computing system 100 includes a host computer 102 having a software platform 104 executing on a hardware platform 106. Hardware platform 106 may include conventional components of a computing device, such as one or more central processing units (CPUs) 108 and system memory 110, as well as a storage system (storage 126), input/output devices 128, and the like. CPU(s) 108 are configured to execute instructions, for example, executable instructions that perform one or more operations described herein and that may be stored in system memory 110 and storage 126. System memory 110 is a device allowing information, such as executable instructions, virtual disks, configurations, and other data, to be stored and retrieved. System memory 110 may include, for example, one or more random access memory (RAM) modules. Storage 126 includes local storage devices (e.g., one or more hard disks, flash memory modules, solid state disks, and optical disks) and/or a storage interface that enables host computer 102 to communicate with one or more network data storage systems. Examples of a storage interface are a host bus adapter (HBA) that couples host computer 102 to one or more storage arrays, such as a storage area network (SAN) or a network-attached storage (NAS), as well as other network data storage systems. IO devices 128 include various network interfaces and the like.

CPU(s) 108 include one or more cores 112. Each core 112 is a microprocessor or like type processor element. Each core 112 includes cache memory (cache 114) and a memory management unit (MMU) 116, as well as various other circuits that are omitted for clarity (e.g., an arithmetic logic unit (ALU), floating point unit (FPU), etc.). CPU(s) 108 can include other circuitry shared by cores 112 (e.g., additional cache memory), which is omitted for clarity.

MMU 116 implements memory management in the form of paging of system memory 110. MMU 116 controls address translation and access permissions for memory accesses made by core 112. MMU 116 implements a plurality of address translation schemes based on privilege level (also referred to as "translation schemes"). Each translation scheme generally takes an input address (IA) and, if permitted based on the defined access permissions, returns an output address (OA). If an address translation cannot be performed (e.g., due to violation of the access permissions), MMU 116 generates an exception. MMU 116 may be controlled by a plurality of system registers. MMU 116 can include a translation lookaside buffer (TLB) 118 that caches address translations.

Hardware platform 110 includes coherence interconnect 140, which may be a point-to-point coherence interconnect between processing components, such as the Intel® Ultra-Path Interconnect (UPI), which is a successor to the Intel® QuickPath Interconnect (QPI), which supports a cache coherence protocol. In the embodiment illustrated herein, another item of processing hardware, a field programmable gate array (FPGA) 130, is installed in one of the CPU sockets and communicates with CPU(s) 108 via coherence interconnect 140. Though the following discussion has the FPGA occupy a CPU socket, the embodiments are not so limited; any arrangement of the FGPA that includes a connection to the coherence interconnect among processors present in computer system 100 is sufficient.

One type of translation scheme includes a single stage of address translation that receives a virtual address (VA) in a virtual address space and outputs a physical address (PA) in a physical address space. The virtual address space is a flat logical address space managed by software. The physical address space includes the physical memory map that includes system memory 110. Another type of translation scheme includes two stages of address translation. The first stage of address translation receives a VA and outputs an intermediate physical address (IPA) in an intermediate physical address space. The second stage of address translation receives an IPA and outputs a PA. The IPA address space is a flat logical address space managed by software. Two-stage address translation is discussed further below with respect to a virtualized computing system.

Software platform 104 includes a host operating system (OS) 140 and applications 142. Host OS 140 executes directly on hardware platform 102. Host OS 140 can be any commodity operating system known in the art, such as such as Linux®, Microsoft Windows®, Mac OS®, or the like. Host OS 140 includes a virtual memory subsystem 144. Virtual memory subsystem 144 comprises program code executable by CPU 108 to manage paging and access to system memory 110 (e.g., on behalf of applications 142).

Virtual memory subsystem 144 divides system memory 110 into pages. A "page" is the smallest unit of memory for which an IA-to-OA mapping can be specified. Each page (also referred to herein as a "memory page") includes a plurality of separately addressable data words, each of which in turn includes one or more bytes. Each address includes an upper portion that specifies a page and a lower portion that specifies an offset into the page. Each address translation involves translating the upper portion of the IA into an OA. CPU(s) 108 can support one or more page sizes. For example, some processors support 4 kilobyte (KB), 2 megabyte (MB), and 1 gigabyte (GB) page sizes. Other processors may support other page sizes. In addition, the width of the IA can be configurable for each address translation scheme.

Each enabled stage of address translation in a translation scheme uses memory mapped tables referred to as page tables 120. If not cached in TLB 118, a given address translation requires one or more lookups from page tables 120 (referred to as one or more levels of lookup). A page table walk, which can be implemented by the hardware of MMU 116, is the set of lookups required to translate a VA to a PA. Page tables 120 are organized into hierarchies, where each page table hierarchy includes a base table and a plurality of additional tables corresponding to one or more additional levels. For example, some processors specify up to four levels of page tables referred to as level 1 through level 4 tables. The number of levels in a page table hierarchy depends on the page size. Virtual memory subsystem 144 can also maintain page metadata 122 for each page defined by the system. Page metadata 122 may include accessed and dirty bits indicating whether a read or a write, respectively has occurred for a page associated with a given page table entry.

Figure 2:
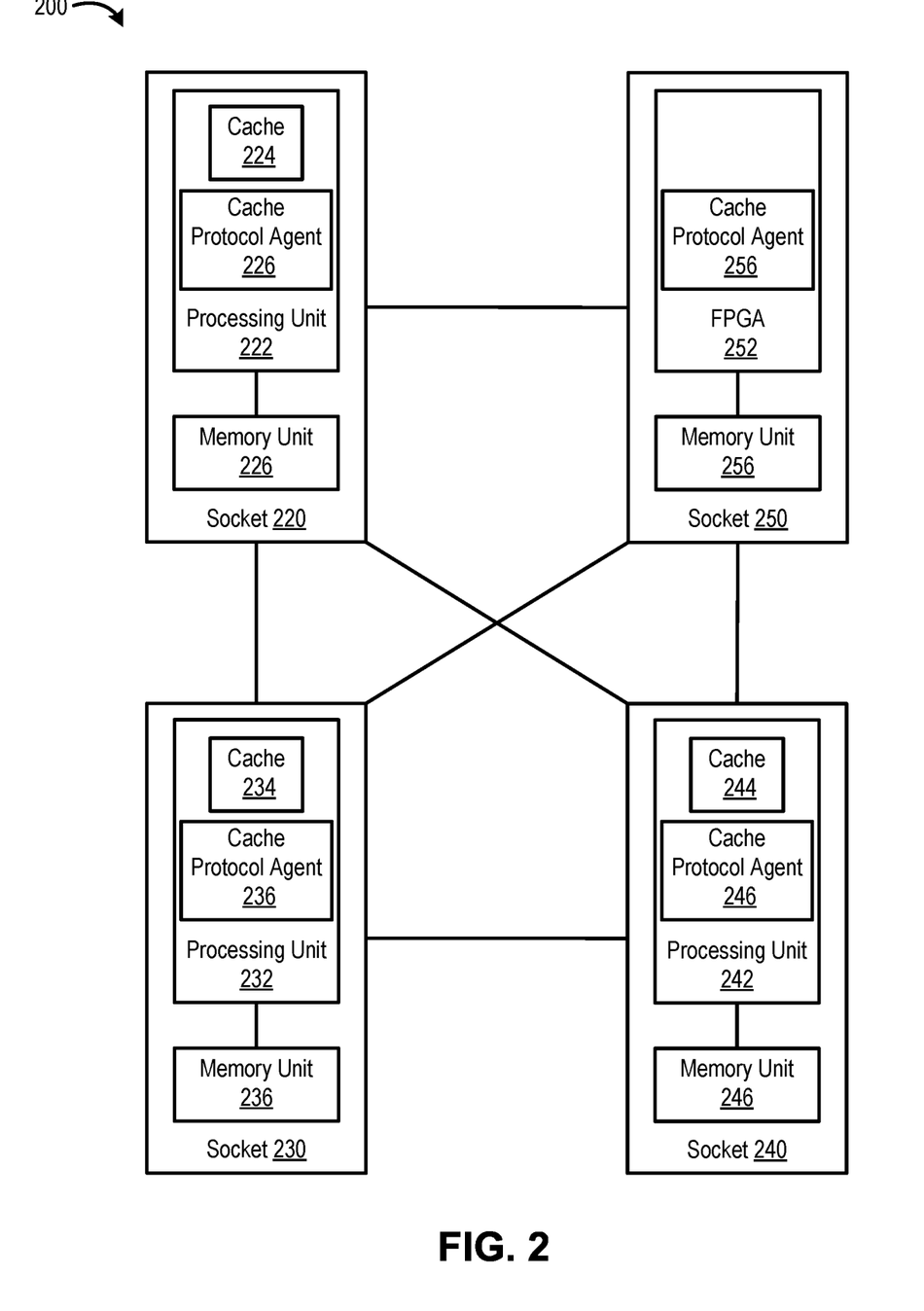
FIG. 2 depicts a block diagram of CPU sockets, in an embodiment.

FIG. 2 depicts a block diagram 200 of CPU sockets, according to embodiments of the present disclosure. For example, block diagram 200 may depict a non-uniform memory access (NUMA) configuration implemented on computing system 100 of FIG. 1. NUMA configurations are used in multiprocessor systems in order to address performance issues that arise when several processors attempt to simultaneously access as single shared memory. In a NUMA configuration, each processing unit associated with a socket has its own section of memory, and possibly its own I/O channels. However, each processing unit can access memory associated with the other processing units. Each socket typically represents a separate NUMA domain.

Block diagram 200 includes a plurality of sockets, e.g., sockets 220, 230, 240, and 250 (generally sockets 220-250), which may represent separate NUMA domains. Sockets 220, 230, and 240 include processing units 222, 232, and 242 and memory units 226, 236, and 246. Each of processing units 222, 232, and 242 may include one or more cores 112 of one or more CPU(s) 108 of FIG. 1. Each of processing units 222, 232, and 242 also includes a cache 224, 234, or 244, each of which may comprise a cache 114 of FIG. 1. Each of memory units 226, 236, and 246 includes a portion of system memory 110 of FIG. 1 that is associated with the respective socket 220, 230, or 240. Each processing unit 222, 232, and 242 can access its respective memory unit 226, 236, and 246 within the same socket (e.g., memory associated with the same socket is local to the processing unit), as well as memory units associated with other sockets.

Socket 250 includes FPGA 252, which may be representative of FPGA 130 of FIG. 1, and memory unit 256, which includes a portion of system memory 110 of FIG. 1 that is associated with socket 250. FPGA 252 can access its local memory unit 256 as well as memory units associated with other sockets. Sockets 220-250 are interconnected with each other. A processing unit or FPGA in one socket can access a memory component in another socket through an interconnection between sockets 220-250.

FPGA 252 further includes application specific modules 254, which are configured by a bitstream representing custom programming of FPGA 254. For example, one or more of application specific modules 254 may perform certain operations described herein related to tracking of dirty cache lines. A cache line (sometimes called a cache block) generally refers to a block of data of fixed size that is transferred between a memory location and a cache. When a cache line is copied from memory into a cache, a cache entry is created, which may include the copied data as well as the memory location from which the data was copied (which may be called a tag). Other modules 258 whose operations are unrelated to application specific modules 254 may also be present in FPGA 252, these modules being configured by a bitstream different from the custom programming bitstream.

It is noted that, while not depicted, each of FPGA 252 and processing units 222, 232, and 242 may also include an interface to its respective local memory unit 250, 220, 230, and 240. a network interface controller (MC), and a communications interface (cif) port that connects to coherence interconnect 140 of FIG. 1.

Sockets 220-250 support a coherence protocol, which is designed to maintain cache coherence in a system with many processors each having its own cache or caches. With FPGA 252 residing in one socket 250 of the CPU sockets, FPGA 252 can monitor and participate in the coherency protocol that keeps the processors' caches coherent.

Cache coherence on coherence interconnect 140 of FIG. 1 is maintained according to a standard cache coherence protocol, such as modified, exclusive, shared, invalid (MESI) protocol or modified, exclusive, shared, invalid, forwarded (MESIF) protocol. In these protocols, cache lines marked invalid signify that the cache line has invalid data and must be brought into a cache (e.g., cache 224) from a memory location (e.g., in memory unit 226). Cache lines marked exclusive, shared, and forwarded (in the MESIF protocol) all signify that the cache line has valid data, but the cache line is clean (not modified), so the cache line can be discarded without writing the cache line back to the memory location from which it was read. A cache line marked as modified signifies the cache line is modified or dirty, and must be written back to the memory location from which it was read before the cache line is discarded from the cache.

To enforce the cache coherence protocol requires a cache protocol agent 226, 236, 246, and 256 for each cache connected to coherence interconnect 140 of FIG. 1. It is noted that cache protocol agents 226, 236, 246, and 256 may, in some embodiments represent aspects of MMU 116 of FIG. 1. Each cache protocol agent 226, 236, 246, and 256 can initiate and respond to transactions on coherence interconnect 140 of FIG. 1 by sending and receiving messages on coherence interconnect 140. In the present embodiments, each of processing units 222, 232, and 242 has a cache protocol agent 226, 236, and 246, and FPGA 252 also has a cache protocol agent 256. The cache protocol agents coordinate with one another by sending messages, including broadcast messages, over coherence interconnect 140 of FIG. 1. In the protocol, one of the cache protocol agents among the several agents present is an owner of a set of cache lines and contains information regarding those cache lines. The other cache protocol agents send messages to the owner agent requesting a cache line or to find the status of cache line owned by the owner agent. The owner agent may service the request directly or request that another cache protocol agent satisfy the request.

When a processing unit accesses a cache line that is not in its cache, at any level of the cache hierarchy, it is the cache protocol agent of the processing unit that requests the cache line from a memory location (e.g., local or remote). It is noted that, in some cases, one or more of caches 224, 234, and 244 may be representative of TLBs, such as TLB 118 of FIG. 1.

When applications have very large working sets, TLBs can cause performance degradation on native machines. Such workloads running in a virtualized system exacerbate this problem. In some machines with large amounts of memory, when applications execute, the TLB misses causes many RAM accesses (not just data cache accesses). This causes the TLB misses to be costly for application performance. This also translates to poor performance for virtual machines with large amounts of memory. Machines with large amounts of memory typically have a multi-socket NUMA architecture. Many of these machines can have different memory access latencies depending on which memory location a particular processing entity is accessing. If page tables are allocated in memory locations associated with different sockets, a TLB miss may cause a processing unit to traverse multiple sockets to resolve the miss and read one or more page table entries into the TLB (e.g., as a TLB cache line, which generally includes eight page table entries). If all the page table entries were in local memory (a memory unit on the same socket as the processing unit), then the TLB miss may have resolved a lot faster, since it would not be affected by NUMA latency effects.

In an embodiment, virtual memory subsystem 144 of FIG. 1 allocates memory space for a master page table in memory unit 256 of socket 250 and for page table replicas in each of memory units 226, 236, and 246 on sockets 220, 230, and 240. In some embodiments, this may involve modifying host OS 140 of FIG. 1 so that virtual memory subsystem 144 allocates this memory space. The technique creates a complete replica of the page table in memory locations associated with each of the sockets, but points to the same data page on the leaf levels. Using conventional techniques, if processing unit 232 (e.g., running an application, such as a virtual machine application) in socket 230 has a TLB miss for data "D" which is local to the socket, it has to perform up to four remote accesses to resolve the TLB miss to only find out that the data was local to its socket and then access the local data. By contrast, with the page table replication described herein, processing unit 232 on a TLB miss for data "D" which is local to socket 230 performs up to four local accesses to resolve the TLB miss and access the local data D. The local accesses for all TLB misses makes the applications run faster.

A page table is mostly managed by software (e.g., host OS 140 or a hypervisor, as described in more detail below with respect to FIG. 5) and read by the hardware (e.g., a processing unit on a TLB miss). Accessed and dirty bits are usually set as metadata in a page table entry atomically by hardware on the first access to the page and first write to the page respectively. These two bits of metadata are only set by the hardware and reset by the OS. When replicated, this metadata needs to be kept coherent (instantly or at least lazily). Accessed and dirty bits are used by the OS for system-level operations like swapping. In an embodiment, virtual memory subsystem 144 of FIG. 1 logically ORs accessed and dirty bits between all the page table replicas when read by the OS. Virtual memory subsystem 144 of FIG. 1 may also set this metadata in the other replicas if one of replicas has it set.

Updates to a page table generally provide a virtual address and an update required to it. For example, a new physical page is allocated for a virtual address on a page fault or a change is made to access permissions on a page through an mprotect system call.

While an OS and/or hypervisor must generally be involved in allocating memory or updating a page table, FPGA 252 can be used to ensure that all updates to the page table are replicated on all page table replicas (e.g., in memory units 226, 236, and 246). As such, embodiments of the present disclosure may involve making certain changes to the OS and/or hypervisor so that memory space is allocated for replicas and so that the OS and/or hypervisor always access the master copy of a page table that is associated with the FPGA when making updates to the page table. Whenever the OS or hypervisor running on a processing unit (e.g., processing unit 222) reads a page table entry into a cache line (e.g., in cache 224), it reads from the master page table in memory unit 256 associated with FPGA 252. In one example, cache protocol agent 226 issues a load cache line transaction to memory unit 256 on coherence interconnect 140 of FIG. 1. The load cache line transaction can be 'Load Shared' for sharing the cache line, or 'Load Exclusive' for cache lines that will be modified. A cache line that is loaded as shared means that the line probably will not be modified. In contrast, a cache line that is loaded as 'Exclusive' is considered potentially dirty, because it is not certain the cache line will be modified. When FPGA 252 determines that processing unit 222 has read a cache line from the master page table in memory unit 256 (e.g., using a 'Load Exclusive' transaction), it may add the cache line to a list of potentially dirty cache lines. The cache line is potentially dirty because it may or may not be modified by processing unit 222. FPGA 252 does not know whether the cache line is dirty until, for example, the cache line is written back by processing unit 222 to the master page table in memory unit 256. A write-back may occur when the cache line is evicted from cache 224, such as due to cache 224 being full, if the cache line has been updated. In other embodiments, FPGA 252 snoops or requests the status of the cache line from processing unit 222. For example, FPGA 252 may snoop all cache lines in its list of potentially dirty cache lines at regular intervals or in response to a triggering event, such as an inter-process interrupt (IPI) issued by a processing unit. The OS and/or hypervisor may be modified in order to issue an IPI prior to performing a TLB flush and to wait until FPGA 252 has completed updating all page table replicas before continuing with the TLB flush. For instance, the OS may issue an IPI before performing a TLB flush, at which point it is important to ensure that all page table replicas are up-to-date. For example, cache protocol agent 256 of FPGA 252 may snoop each cache line in a list of potentially dirty cache lines in accordance with the coherence interconnect protocol over coherence interconnect 140 of FIG. 1. On an IPI, the TLB flush may be delayed until after FPGA 252 updates all page table replicas based on any dirty cache lines.

The operation of writing a cache line is passed on coherence interconnect 140 of FIG. 1 as a write-back transaction and can be monitored by FPGA 252 for tracking dirty cache lines. Upon detecting a write-back of a cache line (e.g., with one or more updated page table entries) to the master page table in memory unit 256, FPGA 252 adds the cache line to a list of dirty cache lines. FPGA 252 propagates the updated page table entries in the list of dirty cache lines to all page table replicas on other sockets (e.g., in memory units 226, 236, and 246), such as at regular intervals or in response to a triggering event (e.g., an IPI). FPGA 252 may update a page table replica based on a dirty cache line by walking (e.g., performing lookups or navigating through) the page table replica and updating any page table entries corresponding to the dirty cache line. For instance, FPGA 252 may determine which page table entries to update in a page table replica by matching VAs in the page table replica entries to VAs in the dirty cache line. While PAs may change due to the updates in the dirty cache lines, the VAs will remain the same. It is noted that page table replicas on different sockets may be updated by FPGA 252 in parallel.

One bottleneck in updating all replicas is walking all of the N page table replicas in an N-socket system. This may require a substantial number of memory references since walking each replica takes up to four memory references on a page fault path or syscall path. As such, an optional improvement may be implemented. In some embodiments, virtual memory subsystem 144 of FIG. 1 may optimize the update path by creating a circular linked list of all replicas using page metadata 122 of FIG. 1. Each of the replica pages points to the next replica page. For example, virtual memory subsystem 144 can use struct page in LINUX, which is allocated for each physical page to store the pointer to the next replica. Similarly, virtual memory subsystem 144 can use other per page data structures in other OSes and hypervisors to create such a circular linked list of page table replicas. FPGA 252 may store a pointer to the circular linked list maintained by virtual memory subsystem 144 and may use the circular linked list to access all page table replicas more efficiently. With this optimization, the update of all N page table replicas takes 2N memory references; N for updating the N page table replicas and N for reading the pointers to the next replica in the circular linked list.

Once FPGA 252 has updated all page table replicas, it may respond to an IPI that was issued previously with an indication that it has completed propagating all page table changes across the system. This may trigger a TLB flush to be performed.

It is noted that in some embodiments the list of potentially dirty cache lines may be omitted, and the FPGA 252 may only maintain a list of dirty cache lines. However, in these embodiments, FPGA 252 will have to flush all of caches 224, 234, and 244 if an IPI for TLB flush is received, as it will not know which particular cache lines to snoop. Alternatively, to avoid the need for FPGA 252 to flush all caches or snoop any cache lines, write-through protection may be enabled for the page table. Write-through protection causes any changes made to a cache line to be automatically written back to the memory location from which the cache line was read. As such, any changes made by a processing unit to a cache line read from the master page table in memory unit 256 would be automatically written back to memory unit 256, which would trigger FPGA 252 to identify the cache line as dirty and propagate the changes to the page table replicas. This improves performance by reducing costly cache flush and/or snoop operations.

If FPGA 252 determines that a page fault has occurred (e.g., on one of processing units 222, 232, or 242 via coherence interconnect 140 of FIG. 1), FPGA 252 will drain its list of dirty cache lines and update all page table replicas in memory units 226, 236, and 246 based on the dirty cache lines as described above. If the page fault was due to a page table replica being out of sync with the latest changes, then the problem will be resolved by the update. If the update does not resolve the page fault, then the OS or hypervisor will resolve the page fault, such as by allocating a new physical memory location for the page and updating the master copy of the page table, and all of the page table replicas will be updated accordingly (e.g., by FPGA 252).

Virtualization brings two layers of page tables to translate addresses. In embodiments, there are two ways of handling the two levels of address translation: 1. replicate on different sockets both levels of page tables while keeping the same exact mappings at both levels of page tables. This option requires the guest OS to know the NUMA architecture; 2. intelligently mapping the guest page tables differently on different sockets. This option is designed to be transparent to the guest OS. There are two ways of achieving this intelligent mapping: (a) The host page table maps the pages of guest page table pages to different host physical pages by using the replicated extended page tables. In general, we can create multiple guest PA->host PA mappings for just the guest page table pages and replicate them on all sockets. For this option, updates to the guest page table must be tracked so that it is correctly updated in all replicas. The guest page tables may be marked as read-only to so that the hypervisor (and/or FPGA) is interrupted on updates to the guest page table (a concept out of shadow paging). (b) Because two-level page tables have longer TLB misses, we can reduce the length of TLB misses by using shadow paging. We can replicate the shadow page table on multiple sockets instead of replicating any parts of two-level page tables. Note that all the optimizations discussed above with respect to FIGS. 1 and 2 (e.g., using an FPGA to track and propagate page table updates to replicas) can be applied to replication of two-level page tables to improve performance.

In some embodiments, the master copy of the page table that is stored in memory unit 256 is a multi-level page table. For example, virtualization may involve the use of multiple levels of page tables or nested page tables in order to translate addresses. In embodiments, a first level of a multi-level page table is a guest page table (e.g., associated with a guest virtual machine) that stores mappings from guest VAs to guest PAs and a second level of the multi-level page table is an extended page table (e.g., associated with a host virtual machine monitor (VMM)) that stores mappings from guest PAs to host PAs. In some embodiments, the guest page table and/or extended page table are replicated in memory associated with each of a plurality of sockets as described herein. In these embodiments, the NUMA architecture has to be exposed to the guest OS so the guest OS can perform replication of guest page tables independent of the extended page table(s). With this option, note that replication is independent in the guest OS and hypervisor: either can decide not to replicate at the cost of performance. For example, the guest OS may decide not to replicate the guest page table and/or extended page table, but the hypervisor may decide to replicate the guest page table and/or extended page table. In one example, the hypervisor replicates the extended page table on each socket on the hardware (assuming the VM is using all sockets). If the VM runs on fewer sockets, the hypervisor may replicate the extended page table only on the sockets where the VM is running. In addition, the VM would be exposed to fewer sockets, so it does not replicate the guest page table more than required. Each replica of the extended page table would translate a guest PA to the same host PA. Each page of the guest page table (even replica pages) is also mapped from a guest PA to the same host PA by each replica of the extended page table. Note that there is no distinction between guest page table pages or data pages for the hypervisor. This allows the hypervisor and guest OS to operate independently.

However, rather than replicating both the guest page table and the extended page table on each socket, certain techniques described herein involve using shadow paging to replicate a shadow page table based on the guest page table and the extended page table. In shadow paging, a shadow page table is maintained by virtual memory subsystem 144 of FIG. 1 that maps directly from guest VA to host PA. The guest page table and extended page table can be stored in memory unit 256, while replicas of a shadow page table are stored in each of memory units 226, 236, and 246. For example, a guest OS and/or hypervisor associated with a VM may be modified to support this nested virtualization embodiment. The guest OS and/or hypervisor may be configured to allocate memory space for the guest page table and extended page as well as shadow page table replicas, and to perform updates to the guest page table and/or extended page table as described herein. On a TLB miss, a processing component (e.g., processing unit 232) walks the socket's local shadow page table (e.g., in memory unit 236) to read page table entries into the TLB. On a page table update, such as a write-back of a cache line to either the guest page table or the extended page table in memory unit 256 (e.g., by an OS or hypervisor running on a processing unit), FPGA 252 updates all of the replicas of the shadow page table in memory units 226, 236, and 246 based on the cache line as described above. Using FPGA 252 to keep replicas of the shadow page table up-to-date avoids the need for a VMM to be involved in updates to the shadow page table replicas. This may improve performance by avoiding costly VMM intervention.

In some embodiments, any VMM intervention that is needed, such as to update the guest page table or extended page table on a TLB flush, can be optimized through the use of paravirtualization. In paravirtualization, an OS being virtualized (e.g., a guest OS of a virtual machine) includes functionality in a way that allows it to be run in isolation. For example, a guest OS may be able to perform a hyper call to the hypervisor, which is essentially a system call from within a virtualized system. According to embodiments the hyper call may be optimized to allow the guest OS to communicate with FPGA 252 in order to facilitate more efficient propagation of updates to all replicas of the shadow page table. Furthermore, paravirtualization may allow guest page table updates to be flushed using special cache flush instructions (e.g., cache line write back) or using non-temporal writes that are not cached in order to reduce the requirement of flushing caches prior to performing a TLB flush.

Using techniques described herein generally improve the functioning of computing systems by improving the efficiency of tracking, updating, replicating, and reading page table entries in multi-socket configurations, such as NUMA configurations. Efficient replication of page tables as described herein reduces latency and improves accuracy of storing and accessing data in memory of multi-socket systems. Furthermore, embodiments of the present disclosure allow for improved efficiency in systems involving nested virtualization by avoiding costly page table walks, VMM intervention, and operations related to leaving virtualized environments (e.g., VMexits) to update page tables.

Recently, there has been an increasing interest in supporting nested virtualization—a VMM can run various VMMs, which can run their own VMs. This approach comes with its own set of benefits: (i) public cloud providers can give consumers full control of their VMs by making them run on their own favorite VMM, (ii) increase security and integrity of VMs on public clouds even when the VMM provided by service provider is compromised, (iii) enable new features used by VMMs which the service providers are slow to adopt (like VM migration), and (iv) help debug, build and benchmark new VMMs.

Hardware advancement such as Virtual Machine Control Structure (VMCS) shadowing are being included in recent processors (e.g., Intel Haswell) to perform efficient nested virtualization. Unfortunately, these benefits of nested virtualization come at the cost of increasing the memory virtualization overheads because of the additional levels of abstraction. As such, the same techniques described above (e.g., using an FPGA to track and propagate page table updates to replicas) can be used to improve performance of nested virtualized systems running on NUMA machines.

I/O page tables are used by devices and accelerators to access system physical memory. In presence of multiple sockets, devices are connected directly to one socket or are shared between multiple sockets. In case the device is shared between multiple sockets, it makes sense to replicate the I/O page tables on sockets which share the devices. This way the device can access the local physical memory by using the closest page table. In addition, the data can be prefetched based on the local I/O page table entry.

Figure 3:
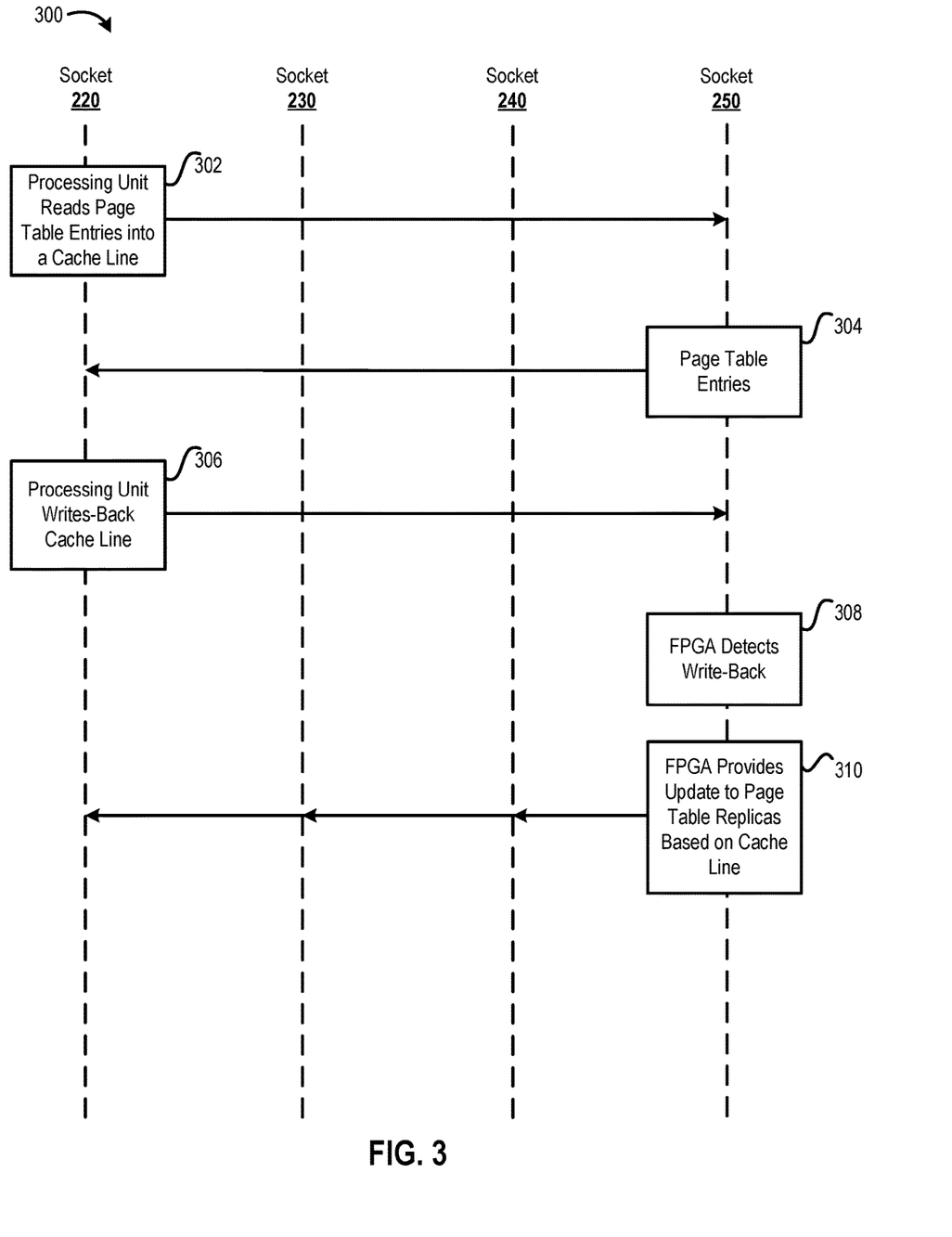
FIG. 3 depicts an example exchange of messages between components related to efficient replication of page tables, according to embodiments of the present disclosure.

FIG. 3 depicts an example 300 exchange of messages between components related to efficient replication of page tables, according to embodiments of the present disclosure. Sockets 220, 230, 240 and 250 in example 300 are representative of sockets 220, 230, 240 and 250 of FIG. 2.

At 302, a processing unit of socket 220 reads page table entries from a memory location associated with socket 250 into a cache line of a cache associated with socket 220. For instance, processing unit 222 of FIG. 1 may be executing an OS, and may read page table entries from a master copy of a page table in memory unit 256 into a cache line of cache 224. At 304, the page table entries are received by the processing unit from the memory location associated with socket 250. In some embodiments, FPGA 252 of FIG. 2, upon detecting the access to the master copy of the page table at 302, adds the cache line to a list of potentially dirty cache lines.

At 306, the processing unit associated with socket 220 performs a write-back of the cache line to the memory location associated with socket 250. For instance, the cache line may have been evicted from cache 224 and, having been updated, may be written back to the memory location from which it was read (e.g., in memory unit 256). In other embodiments, FPGA 252 of FIG. 2 may have snooped the cache line (e.g., based on the cache line being in a list of potentially dirty cache lines), such as in response to an IPI for a TLB flush. In other embodiments, the write-back may be part of a flush of all caches on all of sockets 220, 230, and 240 requested by FPGA 252 of FIG. 2. In other embodiments, write-through protection may be enabled for the page table, and the write-back may have been performed automatically upon the cache line being updated in cache 224.

At 308, the FPGA of socket 250 detects the write-back. For example, FPGA 252 of FIG. 2 may detect the write-back via coherence interconnect 140 of FIG. 1. In some embodiments, FPGA 252 of FIG. 2 adds the cache line to a list of dirty cache lines based on detecting the write-back.

At 310, the FPGA of socket 250 provides an update to page table replicas in memory locations associated with sockets 220, 230, and 240 based on the cache line. For example, FPGA 252 of FIG. 2 may drain its list of dirty cache lines and update all page table replicas based on the dirty cache lines, such as in response to an IPI for a TLB flush or at regular intervals. In some embodiments, FPGA 252 walks each page table replica in order to update relevant page table entries, while in other embodiments, FPGA 252 stores a pointer to a circular linked list of page table replicas maintained by virtual memory subsystem 144 of FIG. 1 and uses the circular linked list to efficiently update all page table replicas.

Figure 4:
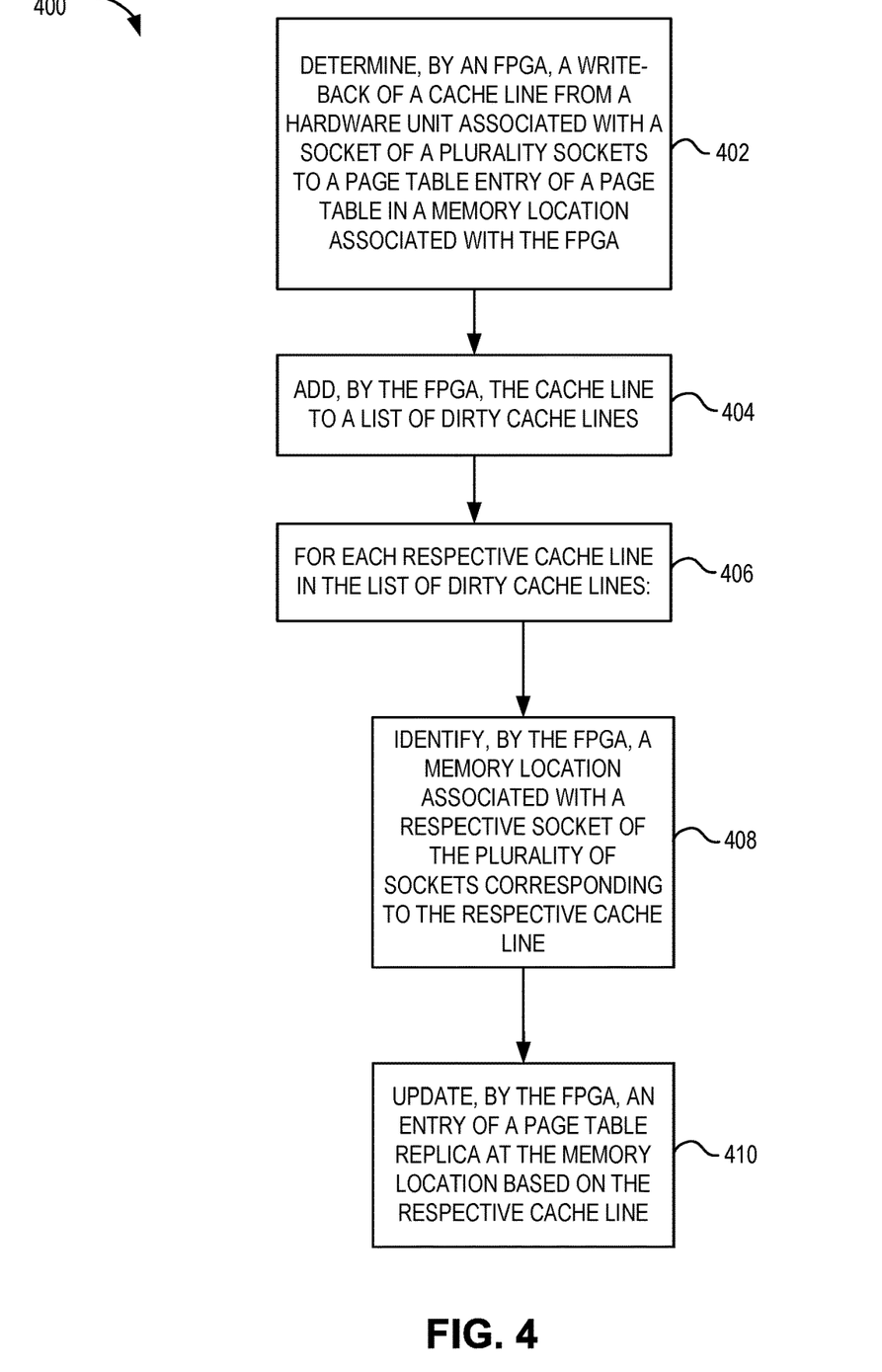
FIG. 4 depicts example operations related to efficient replication of page tables, according to embodiments of the present disclosure.

FIG. 4 depicts example operations 400 related to efficient replication of page tables, according to embodiments of the present disclosure. For example, operations 400 may be performed by FPGA 252 of FIG. 2.

At step 402, the FPGA determines a write-back of a cache line from a hardware unit (e.g., processing unit) associated with a socket of a plurality of sockets to a page table entry of a page table in a memory location associated with the FPGA. The page table may be a single-level or multi-level page table. In some embodiments, the page table is a master copy of a page table. In other embodiments, the page table is a guest page table or an extended page table. The write-back may have been triggered by, for example, the cache line being evicted from a cache on the hardware unit (e.g., processing unit 222 of FIG. 2), FPGA 252 of FIG. 2 snooping the cache line (e.g., based on a list of potentially dirty cache lines that were previously read from the memory location), write-through protection, or a cache flush.

At step 404 the FPGA adds the cache line to a list of dirty cache lines. For example, FPGA 252 of FIG. 2 may maintain a list of all cache lines that have been written back to memory unit 256 of FIG. 2 so that updates to the page table can be propagated to all page table replicas. It is noted that, upon adding the cache line to the list of dirty cache lines, the FPGA thereby detects that the cache line is dirty.

At step 406, for each respective cache line in the list of dirty cache lines, steps 408 and 410 are performed. For example, step 406 may be a process for draining the list of dirty cache lines. Step 406 may be triggered by, for example, FPGA 252 of FIG. 2 receiving an IPI prior to a TLB flush.

At step 408, the FPGA identifies a memory location associated with a respective socket of the plurality of sockets corresponding to the respective cache line. For example, FPGA 252 of FIG. 2 may walk a page table replica in a memory unit associated with the respective socket to locate a memory location of a page table entry containing a VA that matches a VA in the respective cache line. In other embodiments, FPGA 252 of FIG. 2 uses a circular linked list of all page table replicas to identify the memory location.

At step 410, the FPGA updates an entry of a page table replica at the memory location based on the respective cache line. For example, FPGA 252 of FIG. 2 may change a mapping between a VA and a PA stored at the memory location to match an updated mapping identified in the respective cache line. It is noted that cache lines generally include eight page table entries, and steps 408 and 410 may be performed for each page table entry in the respective cache line. Furthermore, steps 408 and 410 may be performed for each respective socket of the plurality of sockets.

Figure 5:
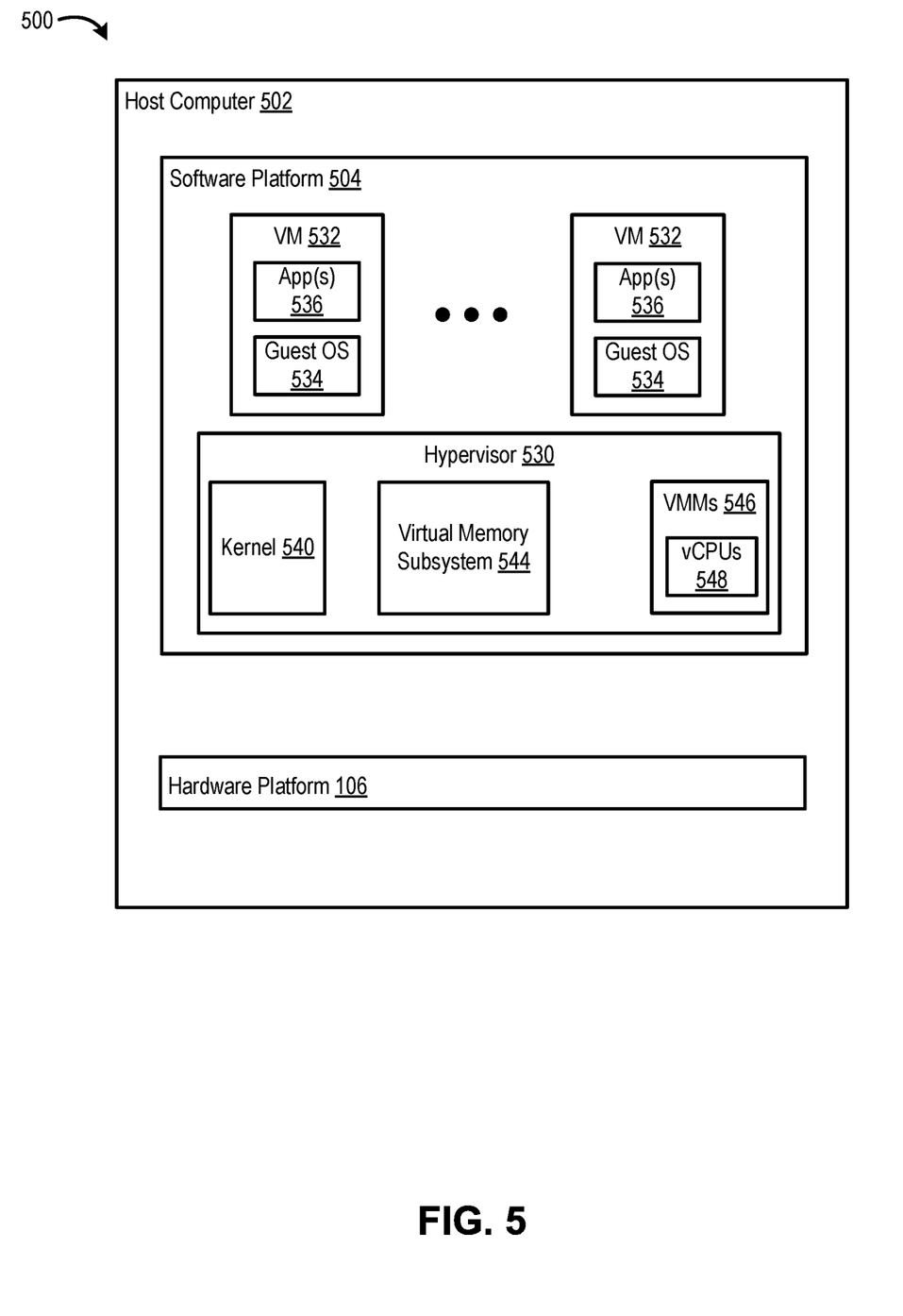
FIG. 5 depicts an example virtualized computing environment in which embodiments may be implemented.

FIG. 5 an example virtualized computing environment 500 in which embodiments may be implemented. Techniques described above with respect to FIGS. 1-4 may, in some instanced be implemented in virtualized computing environment 500.

Virtualized computing environment 500 includes a host computer 502 having the hardware platform 106 and a software platform 504. Hardware platform 106 is the same or similar to that described above in FIG. 1. Software platform 504 includes a virtualization layer that abstracts processor, memory, storage, and networking resources of hardware platform 106 into one or more virtual machines ("VMs") 532 that run concurrently on host computer 502. VMs 532 run on top of the virtualization layer, referred to herein as a hypervisor 530, which enables sharing of the hardware resources by VMs 532. One example of hypervisor 530 that may be used in an embodiment described herein is a VMware ESXi™ hypervisor provided as part of the VMware vSphere® solution made commercially available from VMware, Inc. of Palo Alto, Calif. (although it should be recognized that any other virtualization technologies, including Xen® and Microsoft Hyper-V® virtualization technologies may be utilized consistent with the teachings herein).

Each VM 532 supported by hypervisor 530 includes guest software (also referred to as guest code) that runs on the virtualized resources supported by hardware platform 106. In the example shown, the guest software of each VM 532 includes a guest OS 534 and one or more applications (apps) 536. Guest OS 534 can be any commodity operating system known in the art, such as such as Linux®, Microsoft Windows®, Mac OS®, or the like.

Hypervisor 530 includes, among other components, a kernel 540, a virtual memory subsystem 544, and virtual machine monitors (VMMs) 546. Kernel 540 provides operating system functionality (e.g., process creation and control, file system, process threads, etc.), as well as CPU scheduling and memory scheduling. VMMs 546 implement the virtual system support needed to coordinate operations between hypervisor 530 and VMs 532. Each VMM 546 manages a corresponding virtual hardware platform that includes emulated hardware, such as virtual CPUs (vCPUs 548) and guest physical memory. vCPUs 548 are backed by cores 112. Guest physical memory is backed by system memory 110. Each virtual hardware platform supports the installation of guest software in a corresponding VM 532.

In virtualized computing system 500, guest software in a VM 532 can access memory using a two-stage address translation scheme. In this context, a virtual address is referred to as a "guest virtual address" or GVA. An intermediate physical address is referred to as a "guest physical address" or GPA. A physical address is referred to as a "host physical address" or HPA. As described above, page tables for performing address translation may be efficiently replicated on multiple sockets comprising components of hardware platform 106 through the use of an FPGA of hardware platform 106. Aspects of VMs 532 and hypervisor 530 may be executed using one or more of processing units 222, 232, and 242 of FIG. 2. As such, techniques described herein may allow for improved tracking, updating, replicating, and accessing of page table entries by components of host computer 502.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Certain embodiments may be implemented in a host computer without a hardware abstraction layer or an OS-less container. For example, certain embodiments may be implemented in a host computer running a Linux® or Windows® operating system.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for tracking changes made by an application, comprising:
   determining, by a processor, a write-back of a cache line from a hardware unit associated with a socket of a plurality of sockets to a page table entry of a page table in a memory location associated with the processor;

adding, by the processor, the cache line to a list of dirty cache lines; and for each respective cache line in the list of dirty cache lines:
- identifying, by the processor, a memory location associated with a respective socket of the plurality of sockets corresponding to the respective cache line; and
- updating, by the processor, an entry of a page table replica at the memory location based on the respective cache line.

2. The method of claim 1, further comprising:
- determining, by the processor, that the hardware unit has accessed the page table entry of the page table, wherein the page table entry corresponds to the cache line;
- adding, by the processor, the cache line to a list of potentially dirty cache lines; and
- snooping, by the processor, each respective cache line in the list of potentially dirty cache lines from a respective hardware unit associated with a respective socket of the plurality of sockets that corresponds to the respective cache line; and
- determining, by the processor, the write-back in response to the snooping.

3. The method of claim 1, wherein the page table replica comprises a shadow page table replica that is based on a two-level page table comprising a guest page table associated with a guest system and an extended page table associated with a host system, and wherein the page table on the processor comprises one of:
- the guest page table; or
- the extended page table.

4. The method of claim 1, wherein identifying, by the processor, the memory location associated with the socket corresponding to the respective cache line comprises traversing the page table replica to locate the entry.

5. The method of claim 1, further comprising:
- determining, by the processor, a request for a translation lookaside buffer (TLB) flush;
- flushing, by the processor, a cache associated with each socket of the plurality of sockets; and
- determining, by the processor, the write-back in response to the flushing.

6. The method of claim 1, wherein identifying, by the processor, the memory location on the socket corresponding to the respective cache line comprises using a pointer stored by the processor to access a circular linked list of page table replicas maintained by an operating system or a hypervisor.

7. The method of claim 1, wherein the page table in the memory location associated with the processor includes write-through protection, and wherein the write-back is triggered based on the write-through protection.

8. The method of claim 1, wherein each socket of the plurality of sockets is associated with a respective memory location that stores a respective page table replica, and wherein the processor updates the respective page table replica stored in the respective memory location associated with each socket of the plurality of sockets based on the respective cache line.

9. The method of claim 1, wherein the processor is a field programmable gate array (FPGA).

10. A non-transitory computer-readable medium comprising instructions that, when executed by a processor, cause the processor to perform a method for tracking changes made by an application, the method comprising:
- determining, by the processor, a write-back of a cache line from a hardware unit associated with a socket of a plurality of sockets to a page table entry of a page table in a memory location associated with the processor;
- adding, by the processor, the cache line to a list of dirty cache lines; and
- for each respective cache line in the list of dirty cache lines:
  - identifying, by the processor, a memory location associated with a respective socket of the plurality of sockets corresponding to the respective cache line; and
  - updating, by the processor, an entry of a page table replica at the memory location based on the respective cache line.

11. The non-transitory computer-readable medium of claim 10, wherein the method further comprises:
- determining, by the processor, that the hardware unit has accessed the page table entry of the page table, wherein the page table entry corresponds to the cache line;
- adding, by the processor, the cache line to a list of potentially dirty cache lines; and
- snooping, by the processor, each respective cache line in the list of potentially dirty cache lines from a respective hardware unit associated with a respective socket of the plurality of sockets that corresponds to the respective cache line; and
- determining, by the processor, the write-back in response to the snooping.

12. The non-transitory computer-readable medium of claim 10, wherein the page table replica comprises a shadow page table replica that is based on a two-level page table comprising a guest page table associated with a guest system and an extended page table associated with a host system, and wherein the page table on the processor comprises one of:
- the guest page table; or
- the extended page table.

13. The non-transitory computer-readable medium of claim 10, wherein identifying, by the processor, the memory location associated with the socket corresponding to the respective cache line comprises traversing the page table replica to locate the entry.

14. The non-transitory computer-readable medium of claim 10, wherein the method further comprises:
- determining, by the processor, a request for a translation lookaside buffer (TLB) flush;
- flushing, by the processor, a cache associated with each socket of the plurality of sockets; and
- determining, by the processor, the write-back in response to the flushing.

15. The non-transitory computer-readable medium of claim 10, wherein identifying, by the processor, the memory location on the socket corresponding to the respective cache line comprises using a pointer stored by the processor to access a circular linked list of page table replicas maintained by an operating system or a hypervisor.

16. The non-transitory computer-readable medium of claim 10, wherein the page table in the memory location associated with the processor includes write-through protection, and wherein the write-back is triggered based on the write-through protection.

17. The non-transitory computer-readable medium of claim 10, wherein each socket of the plurality of sockets is associated with a respective memory location that stores a respective page table replica, and wherein the processor updates the respective page table replica stored in the respective memory location associated with each socket of the plurality of sockets based on the respective cache line.

18. The non-transitory computer-readable medium of claim 10, wherein the processor is a field programmable gate array (FPGA).

19. A system, comprising: a processor; and a non-transitory computer-readable medium comprising instructions that, when executed by the processor, cause the processor to perform a method for tracking changes made by an application, the method comprising:

determining, by the processor, a write-back of a cache line from a hardware unit associated with a socket of a plurality of sockets to a page table entry of a page table in a memory location associated with the processor;

adding, by the processor, the cache line to a list of dirty cache lines; and     for each respective cache line in the list of dirty cache lines:

identifying, by the processor, a memory location associated with a respective socket of the plurality of sockets corresponding to the respective cache line; and         updating, by the processor, an entry of a page table replica at the memory location based on the respective cache line.

20. The system of claim 19, wherein the method further comprises:

determining, by the processor, that the hardware unit has accessed the page table entry of the page table, wherein the page table entry corresponds to the cache line;

adding, by the processor, the cache line to a list of potentially dirty cache lines; and     snooping, by the processor, each respective cache line in the list of potentially dirty cache lines from a respective hardware unit associated with a respective socket of the plurality of sockets that corresponds to the respective cache line; and     determining, by the processor, the write-back in response to the snooping.

\* \* \* \* \*